(12) United States Patent
Devine et al.

(10) Patent No.: US 9,162,400 B2
(45) Date of Patent: Oct. 20, 2015

(54) UTILITY TRUCK BASE REINFORCEMENT AND METHOD OF MANUFACTURE

(71) Applicant: Chem-Tainer Industries, Inc., West Babylon, NY (US)

(72) Inventors: Robert Devine, Jupiter, FL (US); Stephen Bacskay, West Babylon, NY (US)

(73) Assignee: Chem-Tainer Industries, Inc. NY (US)

( * ) Notice: Subject to any disclaimer, the term of this patent is extended or adjusted under 35 U.S.C. 154(b) by 0 days.

(21) Appl. No.: 14/320,459

(22) Filed: Jun. 30, 2014

(65) Prior Publication Data

US 2014/0312528 A1    Oct. 23, 2014

Related U.S. Application Data

(62) Division of application No. 13/136,571, filed on Aug. 3, 2011, now Pat. No. 8,764,033.

(51) Int. Cl.
| | |
|---|---|
| *B65D 19/00* | (2006.01) |
| *B29C 70/84* | (2006.01) |
| *B62B 3/00* | (2006.01) |

(52) U.S. Cl.
CPC ............ *B29C 70/84* (2013.01); *B62B 3/003* (2013.01); *B62B 2202/66* (2013.01); *B62B 2301/05* (2013.01); *B62B 2501/04* (2013.01); *B62B 2501/065* (2013.01)

(58) Field of Classification Search
CPC .................... B29C 45/14065; B29C 45/1418
USPC ............................................... 264/271.1, 277
See application file for complete search history.

(56) References Cited

U.S. PATENT DOCUMENTS

| | | | | |
|---|---|---|---|---|
| 3,038,194 A | * | 6/1962 | Arenson | 16/43 |
| 3,875,280 A | * | 4/1975 | Story | 264/510 |
| 6,905,021 B2 | * | 6/2005 | Polumbaum et al. | 206/386 |

* cited by examiner

*Primary Examiner* — Galen Hauth
(74) *Attorney, Agent, or Firm* — Duncan Palmatier

(57) ABSTRACT

A utility truck with arched reinforcing rods incorporated into the base of a plastic truck during molding. The reinforcing rods are held in place in a mold at a predetermined distance above the mold's inner surface by spacers attached to the ends of the rods. Plastic is molded around the rods, with more plastic provided below the rods than above them, so that, when the plastic truck is removed from the mold and allowed to cool, the plastic will contract to a greater extent than the metal rods, causing the base and the reinforcing rods to bow upward, creating a convex arch in the truck's base. The arch provides an inherently strong, bridge-type structure that substantially strengthens the load-bearing capability of the truck, yet requires less reinforcing material than conventional supplemental chassis structures. In another embodiment, caster base mounts are also molded into the bottom of the truck, providing a utility truck with a unitary chassis structure.

4 Claims, 5 Drawing Sheets

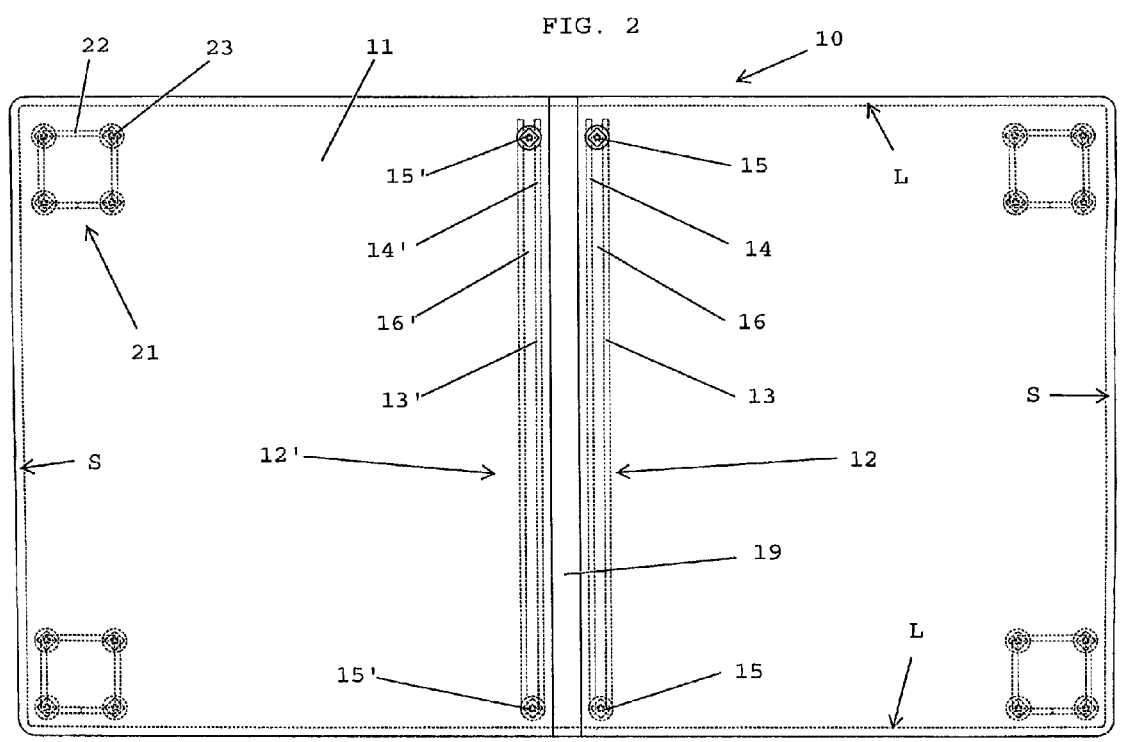

UTILITY TRUCK BASE REINFORCEMENT AND METHOD OF MANUFACTURE

CLAIM OF PRIORITY TO AUG. 3, 2011 APPLICATION SER. NO. 13/136,571 AND PROVISIONAL APPLICATION NO. 61/401,053

This divisional patent application claims priority, under 35 U.S.C. §120, from patent application Ser. No. 13/136,571, filed Aug. 3, 2011, which is scheduled to issue on Jul. 1, 2014, as U.S. Pat. No. 8,764,033, which, in turn, claimed priority, under 35 U.S.C. §119(e), from provisional patent Application No. 61/401,053, filed Aug. 6, 2010. The Ser. No. 13/136,571 and Ser. No. 61/401,053 applications are incorporated herein by reference.

FIELD OF THE INVENTION

The present invention relates generally to utility trucks or carts, such as hotel laundry trucks. More particularly, the present invention relates to a plastic utility truck structure and method of manufacturing such a truck with reinforcing rods incorporated into the plastic truck during molding.

BACKGROUND OF THE INVENTION

Plastic utility trucks are used in many applications, of which hotel or hospital laundry trucks serve as one example. A hotel laundry truck must hold a large quantity of heavy, wet laundry, such as towels. Wet hotel linens gathered in a laundry truck can accumulate and be very heavy, imparting substantial loads on the plastic truck. Plastic laundry trucks will tend to sag under such heavy weights. To overcome the tendency of plastic trucks to sag under such weights, base chassis structures are bolted or glued to the bottom of the truck to increase the strength of the truck. FIG. 1 shows such an arrangement. The utility truck 1 is rectangular in shape, being longer in the front-back direction than side-to-side. The truck 1 is made from molded plastic, as practiced and understood in the art. To increase the load bearing capacity of the truck, a supplemental chassis base 3 is secured to the bottom 2 of the truck. The chassis base 3 is usually made of metal or plastic and is bolted or glued to the truck's bottom 2. At each of the four corners of the chassis base 3, caster wheels 4 are bolted to the base.

A utility truck with such a supplemental chassis base structure requires the construction of the separate chassis. Steel bases are commonly used for this purpose. To maximize strength provided by the metal chassis base to the plastic truck, the metal chassis must have a large surface area, thereby requiring a substantial quantity of metal. Most such metal chassis base structures are constructed of steel, which is expensive. In most applications, the metal chassis base will be prone to oxidation, and this is especially true of a steel chassis in a laundry truck, since the laundry will be wet and promote rust. To prevent the metal from oxidizing, the chassis base is usually powder coated to seal the metal from the surrounding environment. However, chips in the coating are likely to occur during use and allow rust incursion. The construction and powder coating of a metal chassis base is expensive. As noted above, plastic supplemental chassis bases are sometimes used, but these will not provide as much strength as a steel chassis and, nevertheless, still require the manufacture of a separate chassis structure.

In addition to the cost of the separate chassis base structure, the assembly of the molded plastic truck and the separate chassis base requires several additional manufacturing steps after the plastic truck has been removed from the mold. These assembly steps are labor intensive. Also, the chassis base is often attached to the plastic truck with bolts that extend through the bottom of the truck, which creates passages through which liquid can escape. To prevent this, sealant must be applied around these through-bolt mountings, thereby increasing the cost of manufacturing the truck and creating a potential area through which leaks may develop over time as the sealant degrades.

What is needed is a utility truck with a chassis incorporated into the plastic truck, thereby eliminating the need for a separate chassis base structure. Also needed is a method of manufacturing such a truck with a chassis incorporated into the plastic truck during molding. Also needed is such a unitary plastic truck and molded-in reinforcing chassis structure that uses less reinforcing material, provides a lighter truck, yet provides superior structural strength and load-carrying capacity.

SUMMARY OF INVENTION

The present invention discloses a molded plastic utility truck with arched reinforcing rods incorporated into the base of a plastic truck during molding. The reinforcing rods can be placed in a mold and held at a desired distance above the mold's inner surface by spacers or nuts attached to the ends of the rods. Plastic is molded around the reinforcing rods, with more plastic provided below the rods (between the rods and the inner surface of the mold) than above the rods. When the plastic truck is removed from the mold and allowed to cool, the plastic will contract to a greater extent than the metal rods, causing the base and the reinforcing rods to arch or bow. Because the plastic is thicker below the rods, the truck base will bow inward, creating an upward, convex arch in the truck's base. This arch creates an inherently strong, bridge-type structure that substantially strengthens the load-bearing capability of the truck, yet requires less reinforcing material than conventional supplemental chassis structures. If steel is used for the reinforcing rods, rust is prevented without the need for a separate powder coating step, because the metal rods are encapsulated within the plastic of the truck and sealed from exposure to the surrounding environment.

In a preferred embodiment of the present invention, the reinforcing rods are directed from short-side-to-short-side in a rectangular cart having longer and shorter sides, in order to maximize the stiffening effect of the arched reinforcing rods.

In yet another preferred embodiment, caster base mounts are also molded into the bottom of the truck, providing a utility truck with a unitary chassis structure. These caster mounts provide a mounting structure to which caster wheels can be attached without the need for a supplemental chassis structure or bolts extending through the bottom of the truck. The molded-in caster bases also provide some additional reinforcement to the truck, thereby increasing its load-bearing capacity.

BRIEF DESCRIPTION OF DRAWINGS

FIG. 2 is a face view of the bottom of a utility truck of the present invention.

DETAILED DESCRIPTION OF SPECIFIC EMBODIMENTS

Figure 4A:
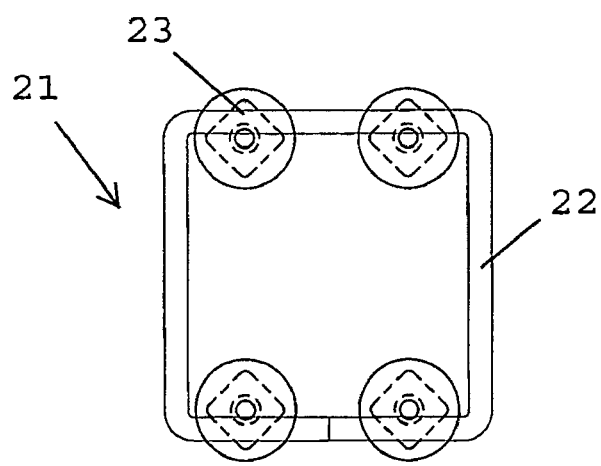
FIG. 4A is a top view of a caster base of the present invention.
Figure 4B:
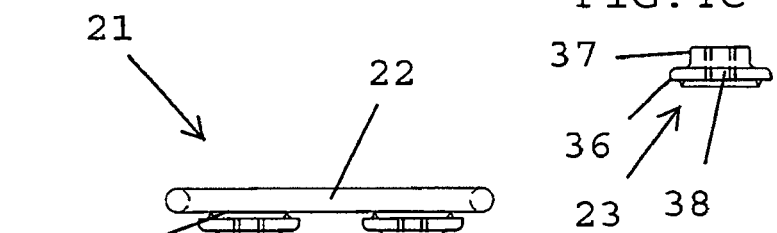
FIG. 4B is a side view of a caster base.
Figure 4C:
FIG. 4C is a side view of a T-nut from the caster base mount.

FIG. 2 shows a view of the bottom 11 of a rectangular plastic utility truck 10 with two pairs of molded-in reinforcing rods, 12 and 12', and molded-in caster bases 21 at each corner. As seen in FIG. 2, the truck 10 is generally rectangular in shape, having longer sides L and shorter sides S. Running transversely across the length L of the bottom 11 of the truck 10, parallel to the shorter sides S, are two pairs of reinforcing rods, 12 and 12'. These rods, 12 and 12', can have any cross section, such as flat, L-shaped, square, rectangular, oval, circular, or otherwise. In a preferred embodiment, the reinforcing rods have a circular cross section, so that they will bend and arch more uniformly, as described below. By way of example, for an average-size hotel laundry truck, circular steel rods may have a diameter of one-quarter inch. In a preferred embodiment, the rods 12 will be paired, with a first rod 13 and second rod 14 running parallel and close (with a gap 16 between each rod of approximately one-half inch) to each other. At either end of the pair of rods 12, a "T" or flange nut 15 is fixed to the rods 12 by any suitable method, such as welding, soldering, gluing, or manufacturing the rods 12 with spacers 15 formed, such as by molding, as part of the rod 12. A side view of a T-nut is shown in FIG. 4C as reference number 23 (in connection with the molded-in caster bases 21, but the T-nuts are the same). The T-nut's flanged side 36 (shown in FIG. 4C) is welded to the rods 12, similar to the arrangement shown in FIG. 4B, described below, with the T-nut's head 37 directed downward toward the exterior surface of the truck. Persons familiar with the art will appreciate that other suitable spacers may be used in place of the T-nuts 15 described here in connection with the preferred embodiment. As shown in FIG. 2, two pairs of reinforcing rods, 12 and 12', are placed parallel to and near each other. This preferred arrangement creates a space 19 between the paired rods, 12 and 12' (the gap between the centers of the T-nuts, 15 and 15', can be approximately three inches). The left-pair of reinforcing rods 12' is formed in a manner like the first pair 12, with a first rod 13' and a second rod 14', a gap 16' between these rods, and T-nuts 15' attached at either end of the rods. In a preferred embodiment, the plastic in the spaces 16 or 19 can be molded into the shape of a reinforcing rib, which further increases the strength of the truck's base 11, especially since the reinforcing rods, 13 and 14, or the two pairs of reinforcing rods, 12 and 12', add mechanical stiffness to the reinforcing plastic rib. That is, there is a synergy between the reinforcing rods, 13 and 14, or the two pairs of reinforcing rods, 12 and 12', and the plastic reinforcing rib molded into the spaces 16 or 19 between the rods, 13 and 14 or 12 and 12'.

Figure 1:
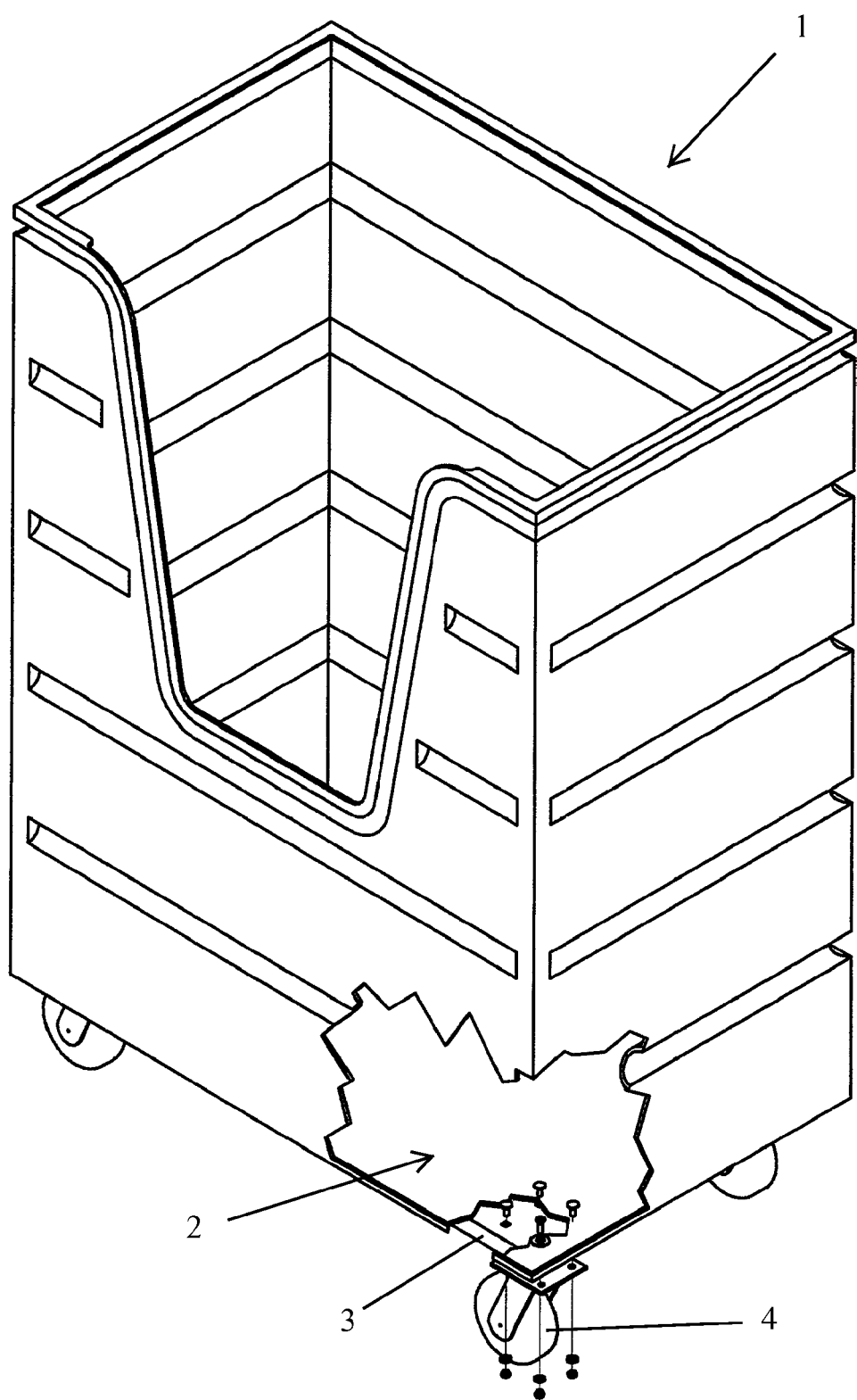
FIG. 1 is a perspective view of a conventional utility truck with a supplemental chassis structure.
Figure 3A:
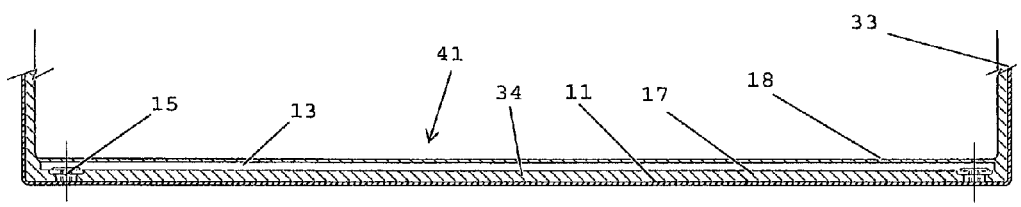
FIG. 3A is a side, cross-section view of the bottom of a utility truck in a mold.
Figure 3B:
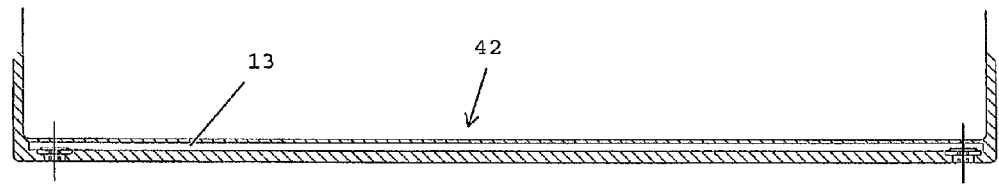
FIG. 3B is a side, cross-section view of the bottom of a utility truck removed from the mold, but before the plastic has cooled.
Figure 3C:
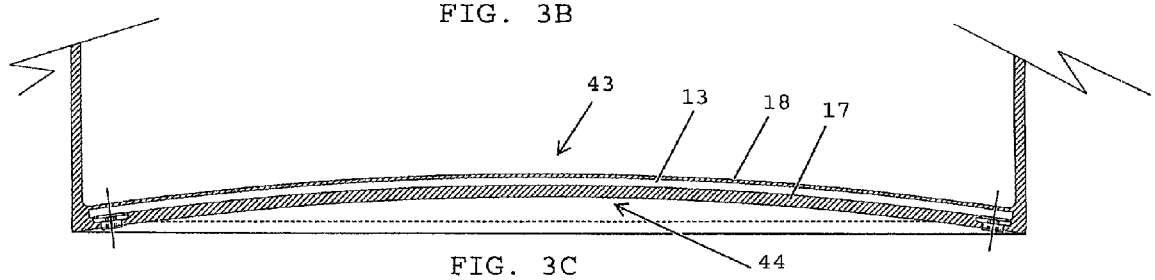
FIG. 3C is a side, cross-section view of the bottom of a utility truck, removed from the mold, after cooling and contraction.

FIGS. 3A through 3C show how the molding process creates a bridge-like arch 44 in the base 11 of the truck. FIG. 3A shows a cross section, viewed into and along the length L of the truck, of the bottom of a plastic truck in a mold, generally indicated as 41. The outer mold 33 surrounds the plastic truck. A reinforcing rod 13 has T-nuts 15 fixed at either end. The height of the T-nut 15 holds the rod 13 a predetermined distance away from the inner surface 34 of the mold 33. By selecting a spacer nut 15 with a certain height, it is possible to adjust the amount of plastic that will be formed in the mold above 18 and below 17 the rod 13. Sufficient plastic is used in the mold to envelop the rod 13, but the amount of plastic formed below 17 the rod 13 is greater than the amount of plastic above 18 the rod 13. FIG. 3B shows the bottom of a plastic truck, with a reinforcing rod 13, removed from its mold, generally indicated as 42. At this point, the plastic is still warm and has not yet started to cool and contract. FIG. 3C shows the bottom of a plastic truck removed from the mold after the plastic has cooled and contracted, generally indicated as 43. After cooling, the plastic base contracts significantly more than the reinforcing steel rod 13, but the rod 13 has sufficient flexibility to bend within the plastic in which it is encapsulated, thereby causing the rod 13 to form an arch 44. By molding more plastic below 17 the rod 13 than above 18 the rod 13, as shown in these figures, the contraction of the plastic will form an arch in the direction of the weaker, thinner plastic area above 18 the rod 13. This molding process forces the reinforcing rod 13 into a bridge-like arch structure, which provides a strong, unitary chassis structure within the plastic truck.

Returning to FIG. 2, caster bases 21 are molded into each corner of the base 11 of the truck 10. Details of the caster bases 21 are shown in FIGS. 4A through 4C. Each caster base 21 has a loop 22. The loop 22 can be made of steel rod, similar to the circular steel rod used for the reinforcing rods 12, and formed into the shape of a square. Other geometries, such as rectangles, triangles, circles, ovals, etc., may also be used. As with the reinforcing rods 12 discussed above, the cross section and material used for the caster base loops 22 (i.e., flat, L-shaped, square, rectangular, oval, circular, or otherwise) may be altered. In the preferred embodiment, circular cross section, one-quarter inch, steel rod is bent into a square shape, then welded to join the ends of the rod. At each corner of the square loop 22 a T-nut 23 is fixed in place by welding, soldering, gluing or any other suitable method. As with the reinforcing rods 12, the T-nuts 23 in the caster bases 21 serve as spacers to hold the base 21 a predetermined distance above the inner surface of the mold during the molding process. A typical T-nut is shown in FIG. 4C, having a larger, flanged base 36, a head 37 above the flange 36, and a threaded bore 38 through the T-nut 23. Persons familiar with the art will appreciate that other suitable spacers may be used in place of the T-nuts 23 described here in connection with the preferred embodiment. As shown in FIG. 4B, the flange 36 of the T-nut 23 is fixed to the loop 22 at joint 25. As described above in connection with fixing the T-nut 15 to the reinforcing rod 12, the T-nut 23 can be fixed to the caster base loop 22 by any suitable method, such as welding, soldering, gluing, or manufacturing the caster base 21 with spacers 23 formed, such as by molding, as part of the base 21. The head 37 of the T-nut 23 extends downward from the loop 22. After molding, the head of T-nut 23 is flush with the bottom 11 of the truck 10 and the threaded bore 38 of the T-nut 23 is available for bolting a caster wheel to it.

Figure 5:
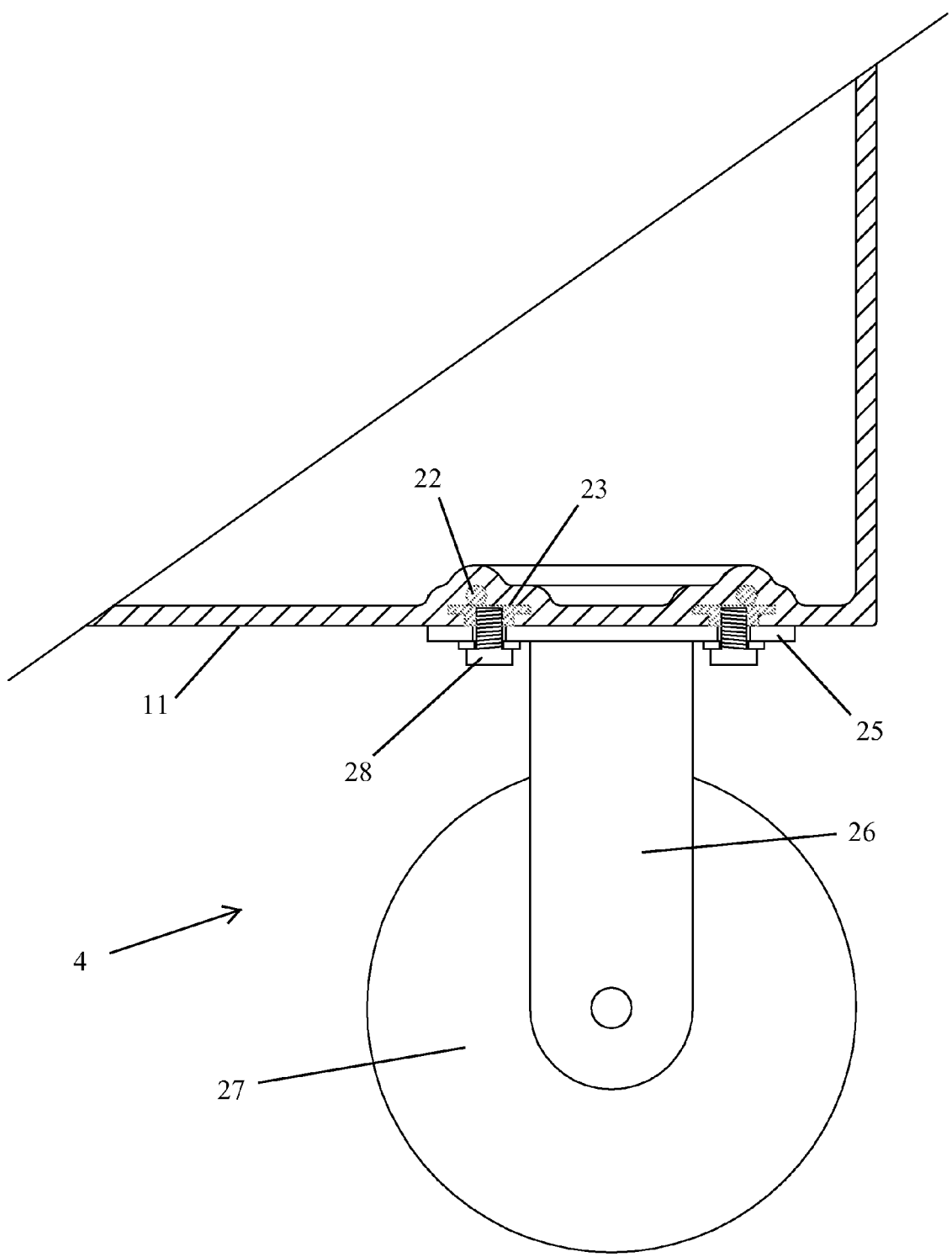
FIG. 5 is a side, cross section view of a portion of the bottom of a utility truck and a caster wheel mounted to the molded-in caster base of the present invention.

FIG. 5 shows how a caster wheel 4 is attached to the molded-in caster base 21. After molding, the caster base loop 22 and T-nuts 23 are encapsulated within the bottom 11 of the truck. A caster wheel assembly 4 is formed of a wheel 27 held in place by a caster wheel fork and axle 26. The fork 26 is rigidly or rotatably connected to a caster mounting plate 25. The mounting plate 25 has holes for bolting the plate 25 in place. By aligning the T-nuts 23 of the caster base 21 with the holes of the caster mounting plate 25, bolts 28 can screw into the threaded bores 38 of the T-nuts 23 and secure the caster 4 to the bottom 11 of the truck without extending through the bottom 11 of the truck. In this way, it is not necessary to drill a hole through the bottom of a plastic truck to bolt wheels to the truck, thereby preserving the integrity of the truck's base. Moreover, when such caster bases 21 are used in conjunction with the arched reinforcing rods 12 of the present invention, it is not necessary to bolt a separate chassis base to the bottom of a truck, and a unitary, reinforced utility truck is provided. Finally, the steel loops 22 of the caster bases 21 provide some structural reinforcement in addition to the reinforcing rods 12, thereby increasing the weight-bearing capacity of the truck.

The T-nuts 15 used with the reinforcing rods, 12 and 12', can also provide mounting points for casters, similar to the T-nuts 23 used with the caster bases 21.

The present invention provides a unitary, reinforced utility truck that eliminates the need for a separate, supplemental chassis base. By so doing, the process of manufacturing the utility truck is greatly simplified and made more efficient. To manufacture a utility truck according to the preferred embodiment of the present invention, two pairs of reinforcing rods, 12 and 12', are placed in a plastic truck mold where the bottom 11 surface of the truck 10 will be formed in the mold. T-nuts, 15 and 15', at the end of the rods, 12 and 12', hold the rods, 12 and 12', a predetermined distance from the mold. As described above and shown in FIGS. 3A through 3C, the distance of a rod, 13, above the mold, is determined by which direction the resulting arch 44 in the rod 13 is desired. In the preferred embodiment, an upward arch 44 is desired in order to provide a convex, bridge-like arch into the truck, which will provide mechanical support to the truck and increase its load-bearing capability. To achieve such an upward, bridge-like arch 44, the height of the T-nuts 15 are selected so that more plastic will be formed under 17 the rod 13 than above 18 the rod 13. Caster bases 21 are placed in each corner of the truck mold. The T-nuts 23 of the caster bases 21 hold the caster bases 21 a predetermined distance from the mold. The square loops 22 of the caster bases 21 have sufficient strength to prevent any significant bending of the caster bases 21 after the plastic truck has been removed from the mold and allowed to cool and contract. Plastic is molded around the rods, 12 and 12', and caster bases 21, with sufficient plastic provided to encapsulate these structures entirely, yet preserve the ratio of plastic molded under 17 the rods, 12 and 12', than above 18 them. After the molding process is completed, the still-warm plastic truck 10 is removed from the mold and allowed to cool. As described above, during this cooling process, the plastic will contract more than the steel rods, 12 and 12'. Because more plastic has been molded below 17 the rods, 12 and 12', than above 18 them, the contracting plastic will force the rods, 12 and 12', upward to form a bridge-like arch 44 in the bottom 11 of the truck 10. Caster wheels 4 are then bolted to the caster bases 21. In an alternative embodiment, sufficient T-nuts 15 can be fixed to the rods 12 to provide mounting points for caster wheels 4.

The drawings and description set forth here represent only some embodiments of the invention. After considering these, skilled persons will understand that there are many ways to make a utility truck according to the principles disclosed. The inventors contemplate that the use of alternative structures, materials, or manufacturing techniques, which result in a utility truck according to the principles disclosed, will be within the scope of the invention.

We claim:

1. A method for manufacturing a unitary reinforced utility truck comprising the steps of:
   providing a mold for forming a plastic utility truck, the mold having a mold base and the mold base having a first mold side and a second mold side and a mold width extending across the mold base from the first mold side to the second mold side,
   providing a first reinforcing member formed of a material that contracts when cooled from a molding heat less than the plastic utility truck contracts from the molding heat, the first reinforcing member having a first end and a second end and a middle portion between the first and second ends,
   providing a first spacer having a top portion and a bottom portion and a spacer height between the top and bottom portions,
   positioning the bottom portion of the first spacer on the mold base with the first reinforcing member positioned on the top portion of the first spacer, wherein the first reinforcing member is held at the spacer height above the mold base, wherein the first reinforcing member extends substantially across the mold width, wherein a lower space is established by the spacer height between the mold base and the first reinforcing member, and wherein the lower space has a lower height measured from the mold base to the first reinforcing member,
   molding plastic within the mold and around the first reinforcing member and first spacer and forming a molded unitary reinforced utility truck bed, the bed having an upper bed surface, wherein the plastic fills the lower space between the mold base and the first reinforcing member and the plastic is further molded to form an upper space above the first reinforcing member, wherein the upper space has an upper height measured from the first reinforcing member to the upper bed surface, and wherein the upper height is less than the lower height, and
   allowing the molded unitary reinforced utility truck bed to cool after molding so that contraction of the plastic forces the middle portion of the first reinforcing member to bow upward in the direction of the upper bed surface.

2. The method for manufacturing a unitary reinforced utility truck of claim 1, wherein the first reinforcing member is formed of metal.

3. The method for manufacturing a unitary reinforced utility truck of claim 1, further comprising the steps of:
   providing a ridge in the mold base, the ridge directed upward from the mold base, and the ridge extending in the direction of the mold width,
   providing a second reinforcing member substantially identical to the first reinforcing member,
   providing a second spacer substantially identical to the first spacer,
   positioning the second spacer on the mold base with the second reinforcing member positioned on the second spacer, and further positioning the second reinforcing member along side the first reinforcing member so that the first and second reinforcing members are substantially parallel to each other and extend substantially across the mold width, wherein a rib space is formed between the first and second reinforcing members, and
   forming a reinforcing rib in the molded unitary reinforced utility truck bed, wherein the reinforcing rib is formed during molding over the ridge in the mold base and between the first and second reinforcing members of the unitary.

4. The method for manufacturing a unitary reinforced utility truck of claim 1, further comprising the steps of:
- providing a wheel mounting base,
- providing a spacer nut having a top portion and bottom portion and a threaded bore communicating with the bottom portion,
- positioning the bottom portion of the spacer nut on the mold base with the wheel mounting base positioned on the top portion of the spacer nut, and
- embedding the wheel mounting base and spacer nut in the molded unitary reinforced utility truck bed during molding.

\* \* \* \* \*